US009416810B2

(12) United States Patent
Swinderman

(10) Patent No.: US 9,416,810 B2
(45) Date of Patent: Aug. 16, 2016

(54) ELASTOMERIC RETAINING DEVICES FOR JOINING ELEMENTS

(71) Applicant: RToddS Engineering, LLC, Palm Coast, FL (US)

(72) Inventor: R. Todd Swinderman, Palm Coast, FL (US)

(73) Assignee: RTODDS ENGINEERING, LLC, Palm Coast, FL (US)

( * ) Notice: Subject to any disclaimer, the term of this patent is extended or adjusted under 35 U.S.C. 154(b) by 42 days.

(21) Appl. No.: 14/328,899

(22) Filed: Jul. 11, 2014

(65) Prior Publication Data

US 2016/0010676 A1 Jan. 14, 2016

(51) Int. Cl.
F16B 37/14 (2006.01)
F16B 29/00 (2006.01)

(52) U.S. Cl.
CPC ................................. *F16B 29/00* (2013.01)

(58) Field of Classification Search
CPC ................................ F16B 29/00; F16B 37/14
USPC .......... 411/9, 372.5, 383–384, 396, 516–517, 411/907
See application file for complete search history.

(56) References Cited

U.S. PATENT DOCUMENTS

| | | | |
|---|---|---|---|
| 1,558,267 A | 10/1925 | McGuckin | |
| 1,620,960 A | 3/1927 | Goetting | |
| 2,017,088 A | 10/1935 | Bihler | |
| 2,273,861 A | 2/1942 | Green | |
| 2,287,233 A | 6/1942 | De Ford | |
| 2,356,400 A | 8/1944 | Hanson | |
| 2,367,480 A | 1/1945 | Beswick | |
| 2,491,089 A | 12/1949 | Cowden | |
| 2,532,972 A | 12/1950 | Vertin | |
| 2,567,352 A | 9/1951 | Rozmus | |
| 2,664,771 A | 1/1954 | Elliott | |
| 2,664,772 A | 1/1954 | Arey | |
| 2,722,148 A | 11/1955 | Woyton | |
| 2,753,747 A | 7/1956 | Brown | |
| 2,770,157 A | 11/1956 | Moreo | |
| 3,145,595 A | 8/1964 | Mauck | |
| 3,151,512 A | 10/1964 | Charczenko | |
| 3,232,148 A | 2/1966 | Dearing | |
| 3,379,078 A | 4/1968 | Sallows | |
| 3,507,172 A | 4/1970 | Smith | |
| 3,630,107 A | 12/1971 | Carr | |
| 3,665,791 A | 5/1972 | Carr | |
| 3,834,253 A | 9/1974 | Carr | |
| 4,170,909 A | 10/1979 | Wagner | |
| 4,256,157 A | 3/1981 | Grayson | |
| 4,406,188 A | 9/1983 | Mills | |
| 4,416,173 A | 11/1983 | Rebish | |
| 4,552,039 A | 11/1985 | Fisher | |
| 4,557,654 A * | 12/1985 | Masuda | F16B 37/14 411/373 |

(Continued)

*Primary Examiner* — Roberta Delisle
(74) *Attorney, Agent, or Firm* — Terry M. Sanks, Esq.; Beusse Wolter Sanks & Maire, PLLC

(57) ABSTRACT

Elastomeric joining element retaining devices are disclosed. In an aspect, a retaining device is disclosed which is constructed from an elastomeric material such as polyurethane and designed to receive and align an assembly or "stack-up" of nuts, bolts, washers, and/or other joining elements. The retaining device retains and aligns the assembly, enabling a user to install the assembly accurately without dropping or misaligning portions of the assembly. Such retaining devices ease the process of installing or removing joining elements in hard to reach locations.

29 Claims, 8 Drawing Sheets

(56) References Cited

U.S. PATENT DOCUMENTS

| | | | |
|---|---|---|---|
| 4,620,460 A | 11/1986 | Gonzales, Jr. | |
| 4,744,273 A | 5/1988 | Bartok, Jr. | |
| 4,777,853 A | 10/1988 | Bauer | |
| 4,787,273 A | 11/1988 | Griffith | |
| 4,836,059 A | 6/1989 | Arnold | |
| 4,838,131 A | 6/1989 | Rhoades | |
| 4,843,923 A | 7/1989 | Voss | |
| 4,906,036 A * | 3/1990 | James | E05B 63/0056 292/202 |
| 4,939,959 A | 7/1990 | Rokita | |
| 5,146,814 A | 9/1992 | Vasichek | |
| D337,514 S | 7/1993 | Nasca | |
| 5,228,582 A | 7/1993 | Marshall | |
| 5,323,673 A | 6/1994 | Martinez | |
| 5,326,068 A | 7/1994 | Spears | |
| 5,584,629 A * | 12/1996 | Bailey | A61C 8/0022 403/334 |
| 5,642,647 A | 7/1997 | Peruski | |
| 5,896,792 A | 4/1999 | Hurt | |
| 6,138,538 A | 10/2000 | Neijdorff | |
| 6,302,000 B1 | 10/2001 | Smith | |
| 6,360,634 B1 | 3/2002 | Leitch | |
| 6,398,471 B1 * | 6/2002 | Fischer | F16B 31/02 411/431 |
| 6,698,986 B2 * | 3/2004 | Fraleigh | E03D 11/16 411/301 |
| 7,246,540 B2 | 7/2007 | Rillera | |
| 7,658,580 B1 * | 2/2010 | Conway | A47G 3/00 411/374 |
| 8,726,769 B1 | 5/2014 | Jacker | |
| 2005/0100425 A1 * | 5/2005 | Wu | F16B 37/14 411/372.5 |
| 2006/0042423 A1 | 3/2006 | Karol | |
| 2007/0295173 A1 | 12/2007 | Swartz | |
| 2010/0269643 A1 | 10/2010 | Kelly et al. | |
| 2013/0208228 A1 | 8/2013 | Maidla | |

\* cited by examiner

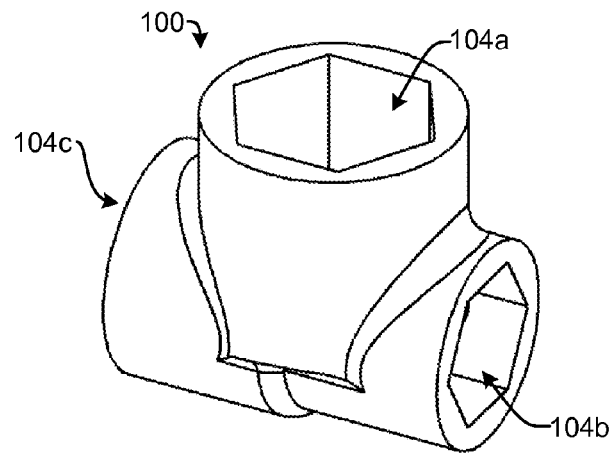
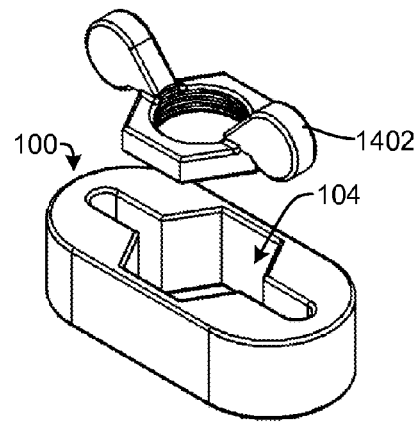
FIG. 13        FIG. 14
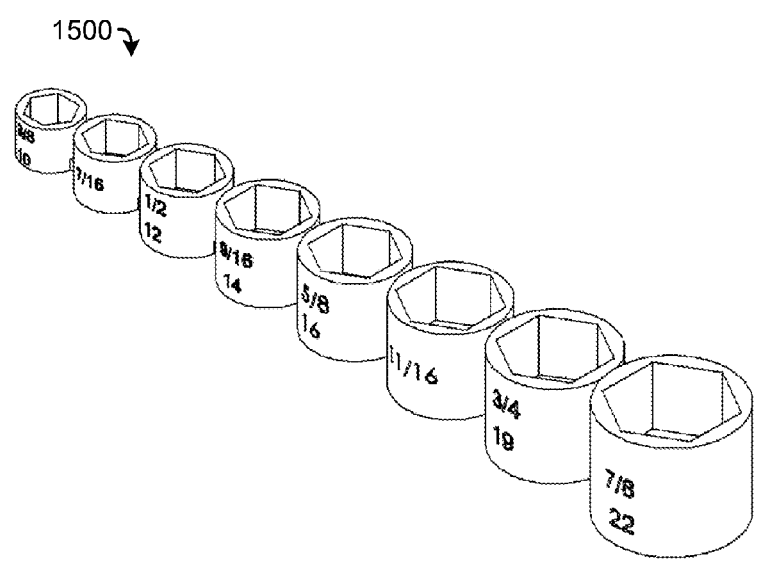
FIG. 15

US 9,416,810 B2

ELASTOMERIC RETAINING DEVICES FOR JOINING ELEMENTS

FIELD OF THE DISCLOSURE

The present disclosure relates to hand tools and more particularly to equipment for manipulating fasteners and fastener assemblies.

BACKGROUND

Installing, locating or removing fasteners, washers, spacers, clips, assembly components or similar devices is often difficult, especially in hard to reach or orientate places. There are numerous standard threaded fasteners such as bolts, nuts and complimentary components, such as washers, used to assemble, locate and attach all kinds of parts on machines, household furnishings, buildings and the like. There are numerous other specialty fasteners, components and subassemblies that must be inserted in a particular order and position. Due to the virtually infinite mating orientations of components that must be fastened or inserted together it is often necessary to install a fastener or an assembly of fastener components in difficult to access or blind locations. Installing a fastener or an assembly of fastener components may be assisted by applying a sticky material (e.g., gum, spittle, double-sided tape, resin, and the like) between the backside of a fastener and a user's finger in an attempt to temporarily overcome gravity and carefully guide the fastener into position. This requires a significant amount of patience and balance and is not suitable for all installation locations. In blind situations the "feel" of the fastener making proper engagement is often required, confirming proper engagement. Further, this process is difficult when installing an assembly of fastener components because only the fastener itself is retained by the sticky material. Components often become misaligned, resulting in cross threading or the components falling and becoming lost or ending up in difficult to retrieve locations. In some cases, the loss of a fastener can be catastrophic such as when the fastener falls into a machine and latter becomes lodged in moving components.

In addition to the methods previously described, there are many specialized tools and accessories for installing fasteners in these situations. Such devices include special mechanical or magnetic gripping features. The tools themselves often interfere with easy alignment of the fastener and the mating thread or component feature thus making final assembly/disassembly difficult.

Magnetized sockets are known which provide some retaining force for ferromagnetic nuts, bolts and other fasteners. Magnetic inserts, such as the inserts disclosed in U.S. Pat. No. 5,146,814 issued on Sep. 15, 1992 to Richard Vasichek (the '814 Patent), are known which may be placed inside nonmagnetic sockets and provide a magnetic retaining force. These devices are not suitable for aluminum components, plastic components, and other non-ferromagnetic components.

U.S. Pat. No. 5,323,673 issued on Jun. 28, 1994 to Florence Martinez et al. (the '673 Patent) discloses a nut or bolt holder socket having a leg, beam, cam, or other mechanism positioned within the socket cavity for retaining a nut within the socket, thereby aiding the use in installing the nut in a hard to reach place.

U.S. Pat. No. 5,896,792 issued on Apr. 27, 1999 to Jon Hurt (the '792 Patent) discloses a thin, flexible plastic holder designed to retain a bolt in a socket by reducing the tolerance between the bolt head and the socket, creating a friction fit which holds the bolt within the socket. An enlarged head of the holder is placed between the bolt head and the socket and deformed therebetween as the bolt head is forced into the interior of the socket. A second enlarged head of the holder is deformed between the drive socket and a wrench drive fitting or extension in order to retain the holder.

U.S. Pat. No. 6,302,000 issued on Oct. 16, 2001 to James Smith (the '000 Patent) discloses a device for positioning nuts in cramped spaces. The '000 Patent device is a wire having a handle at a first end and a bend second end. The bent second end is arranged such that a nut may be placed within the bent section, held there and placed on a target bolt. The '000 Patent device does not provide any lateral support for the nut. The bent section merely loops around a portion of the perimeter of the nut.

U.S. Pat. No. 7,246,540 issued on Jul. 24, 2007 to Robert Rillera (the '540 Patent) discloses a fastener retaining device capable or retaining multiple nuts, bolts, and washers and starting installation of such joining elements via three extendable gripping prongs. The inside surfaces of the prongs contact and retain the joining elements and a desired torque may be applied via an attached handle. A lever on the handle allows the user to extend or retract the gripping prongs, causing the device to release or engage a joining element.

Given the foregoing, what is needed are devices which retain nuts, bolts, washers and assemblies thereof during installation, particularly in hard to reach places or in locations where it is difficult to maintain the alignment of such assemblies and experience the "feel" of proper engagement during installation. In particular, devices are needed which can, without magnets, retain and facilitate the installation of nuts, bolts, washers, spacers, other joining elements and assemblies thereof. Low profile devices and/or devices capable of providing support in more than one direction are also needed.

SUMMARY

This summary is provided to introduce a selection of concepts in a simplified form that are further described below in the Detailed Description. It is not intended to identify key features or essential features of the subject matter to be claimed, nor is it intended to be used to limit the scope of the subject matter to be claimed.

For the purposes of the present disclosure, the term "joining element" and/or the plural for of this term may be used throughout herein to refer to objects which singly or in conjunction with other objects are used to mechanically join or affix two or more objects together. Joining elements include, but are not limited to, nuts, bolts, screws, washers, spacers, retaining rings, and the like.

The present disclosure is directed to devices which retain one or more joining elements and assemblies thereof during installation, storage or removal. Such devices help reduce the risk of dropping joining elements during installation or removal which, as disclosed above, may slow operations or damage equipment.

In some aspects, devices in accordance with the present disclosure facilitate installation or removal of joining elements from tight spaces, hard to reach places and blind installation locations. Aspects of the present disclosure ensure that joining element assemblies remain aligned during installation, avoiding cross threading and other installation failures.

In an aspect, an elastomeric joining element retaining device is disclosed. The device is constructed of an elastomeric material such as neoprene rubber or polyurethane. The device includes a cavity designed to receive and align an assembly or "stack-up" of multiple joining elements along a central attachment axis. Each of the joining elements may be retained within the cavity at a location having a perimeter equal to the outer walls of the joining element. The elastomeric material retains each joining element via a friction fit applied to the outer walls of the joining element. In some aspects, the cavity walls stretch slightly when the joining elements are inserted and the tension in the elastomeric material facilitates retaining and aligning the joining elements. In other aspects, the cavity is configured to receive a single joining element, such as a single wing nut, hex head bolt, or the like.

In some aspects, devices in accordance with the present disclosure are constructed from elastomeric materials having a hardness of approximately 80 Shore A.

Aspects of the present disclosure facilitate installation, removal, and/or starting of joining elements and assemblies of joining elements without using magnets (which are unsuitable for plastics and non-ferromagnetic materials) or gripping prongs (which may damage objects, bend or break with usage) and provide support for the joining elements in more than one direction.

In an aspect, an elastomeric joining element retaining device is provided which is constructed of a disposable material. The retaining device may be provided to a user (e.g., a consumer as part of a kit) containing an assembly of joining elements (e.g., a bolt having two washers positioned on the bolt shank), enabling the user to install the assembly of joining elements contained therein using the retaining device and discard or save the retaining device for subsequent reuse.

In aspects of the present disclosure, retaining devices are provided which have exterior surface features which help users grip the retaining device as it is turned. Retaining devices may also be manufactured with low profile clearances, thereby enabling such retaining devices to fit into standard wrench clearance openings and recesses regardless or orientation.

In aspects of the present disclosure, an end portion of the retaining device comprises a drive socket, enabling the retaining device to be attached to, for example, a ratchet wrench, and install or remove compatible joining elements. Retaining devices may be manufactured to accommodate standard fasteners and joining element assemblies such as those specified in ANSI, ASME, SAE or ISO standards. Retaining devices may also be manufactured to accommodate specialty fasteners, unusual combinations of joining elements, and the like.

In an aspect, devices produced in accordance with the present disclosure may be can be one piece, reducing the complexity of manufacture and increasing the utility of the device.

Further features and advantages of the devices and systems disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIG. 13 is a top perspective view of an elastomeric joining element retaining device having two cavities for retaining joining elements, in accordance with an aspect of the present disclosure.

FIG. 14 is a top perspective view of an elastomeric joining element retaining device configured for a wing nut, in accordance with an aspect of the present disclosure.

FIG. 15 is a top perspective view of a set of elastomeric joining element retaining devices, in accordance with an aspect of the present disclosure.

DETAILED DESCRIPTION

Figure 1:
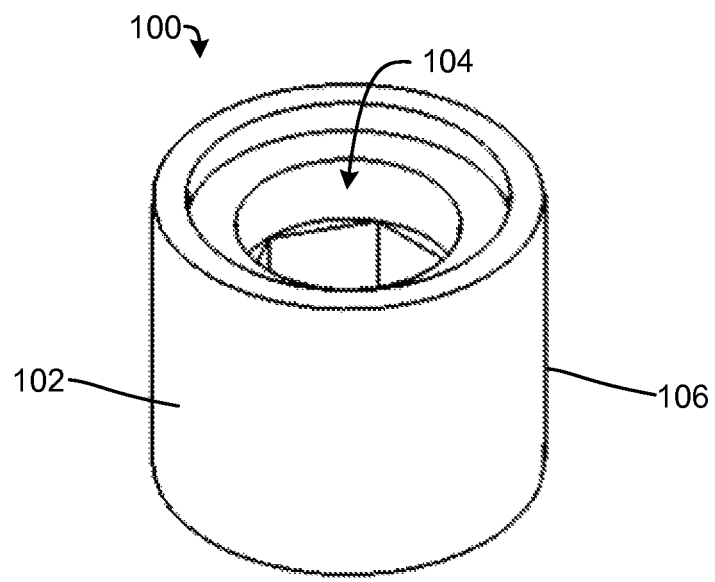
FIG. 1 is a top perspective view of an elastomeric joining element retaining device, in accordance with an aspect of the present disclosure.

The present disclosure is directed to elastomeric joining element retaining devices which retain one or more joining elements and assemblies thereof during installation or removal. Such devices facilitate installation, removal, storage and/or manipulation of joining elements. Further, such devices help reduce the risk of dropping joining elements during installation or removal which may slow operations or damage equipment.

For the purposes of the present disclosure, the term "joining element" and/or the plural for of this term may be used throughout herein to refer to objects which singly or in conjunction with other objects are used to mechanically join or affix two or more objects together. Joining elements include, but are not limited to, nuts, bolts, screws, washers, spacers, clips, posts, pins, studs, retaining rings, and the like.

Referring now to FIGS. 1-4, various views of an elastomeric joining element retaining device 100, including a top perspective view, a cutaway view, a view of various joining elements of an assembly which may be retained within the retaining device 100, and an assembly loaded into retaining device 100, in accordance with aspects of the present disclosure, are shown.

In various aspects, retaining device 100 may be constructed of rubber, synthetic rubber, neoprene rubber, polyurethane, a synthetic pliable material, recyclable plastic, natural fibers, or any other materials having appropriate flexibility and durability requirements identified by a person skilled in the relevant art(s) after reading the description herein. In various aspects, retaining device 100 may be constructed of, for example, an oil resistant elastomer having a hardness of approximately 80 Shore A. Retaining device 100 may be constructed of multiple materials, including materials of various hardnesses. For example the material surrounding cavities 202, 204, 206 may be 80 Shore A rubber. The rubber may be bonded to material around cavity 208 which comprised of a harder material such as plastic or metal, or a softer material such as 60 Shore A rubber. Retaining device 100 may contain specialized reinforcements or fibers such as anti-static materials for use with sensitive electronic components or Kevlar fibers for added strength to reduce the overall diameter but still maintain sufficient mechanical properties for the intended use.

In some aspects, device 100 is constructed with an overall buoyancy that allows device 100 to float in water. Device 100 may be constructed of foamed urethane, rubber or a similar material. The overall buoyancy may take into account the mass of joining elements device 100 is designed to carry, thereby allowing device 100 and inserted joining elements to avoid being lost by floating if dropped in water.

Retaining device 100 includes a retaining device body 102 having an outer surface 106, a first end portion and a second end portion. One or more cavities 104 are present within retaining device body 102. Cavity 104 is a recess configured to receive one or more joining elements. In some aspects, retaining device 100 is provided with joining elements or an assembly of joining elements already deposited within cavity 104 for quick deployment, storage, and the like.

Installing, removing, or otherwise manipulating joining elements via cavity 104 facilitates installation, removal, and/or starting of joining elements and assemblies of joining elements without using magnets (which are unsuitable for plastics and non-ferromagnetic materials), gripping prongs (which may damage objects are difficult to orient and maintain relative positions of joining elements, remove the "feel" of correct alignment and engagement) and provide support for the joining elements in more than one direction because cavity 104 may envelope multiple sides of the joining element or assembly of joining elements.

In some aspects, device 100 is molded from an elastomer and body 104 is configured to receive one or more standard SAE half-inch fasteners. Body 104 may have dimensions of approximately 1¾ inches in diameter and 1½ inches tall.

In some aspects, body 102, or all of device 100 may be constructed of a disposable material or a material which degrades or breaks down after a single use or a few uses. Such single use or disposable or recyclable retaining devices 100 may be created from low-cost materials and be useful for installing joining elements and/or assemblies in furniture kits and the like, rather than, or in addition to tools supplied within the kit or user-supplied tools. Retaining device 100 may be provided to a user (e.g., a consumer as part of a kit) containing an assembly of joining elements (e.g., a bolt having two washers positioned on the bolt shank), enabling the user to install the assembly of joining elements contained therein using retaining device 100 and discard or save the retaining device for subsequent reuse. Joining elements may by prepackaged in retaining device 100, reducing packaging count and assembly errors.

Figure 2:
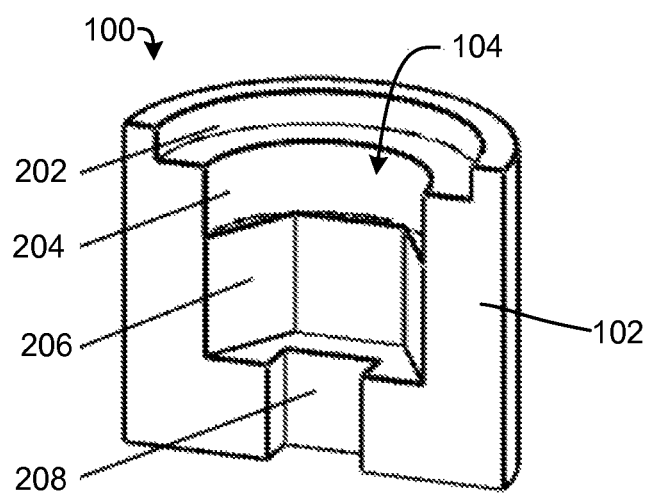
FIG. 2 is a cutaway view of the elastomeric joining element retaining device of FIG. 1.
Figure 3:
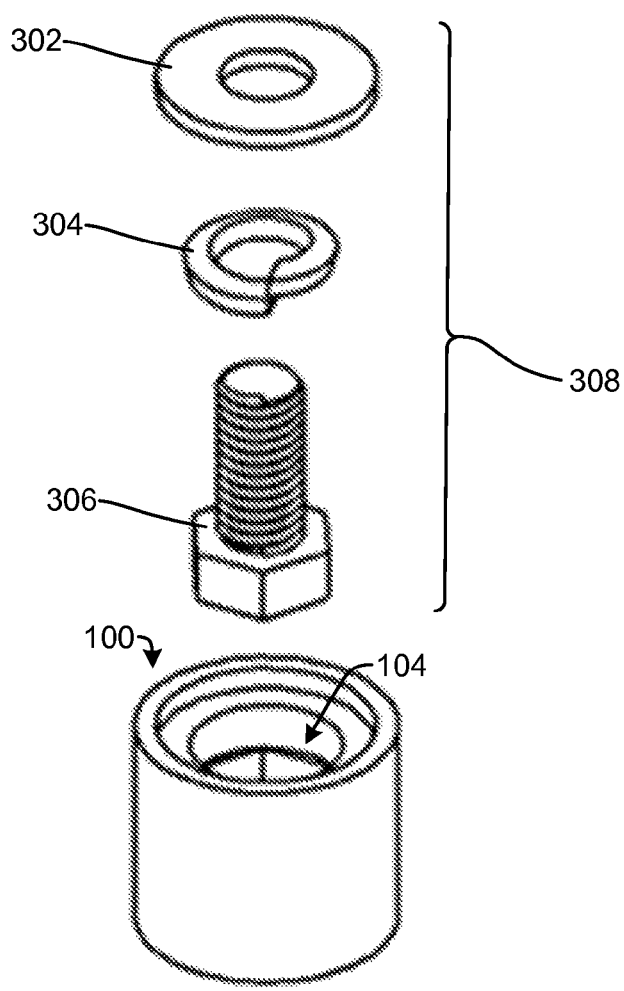
FIG. 3 is a perspective view of an elastomeric joining element retaining device of FIGS. 1-2 showing various joining elements of an assembly which may be retained within the retaining device.
Figure 4:
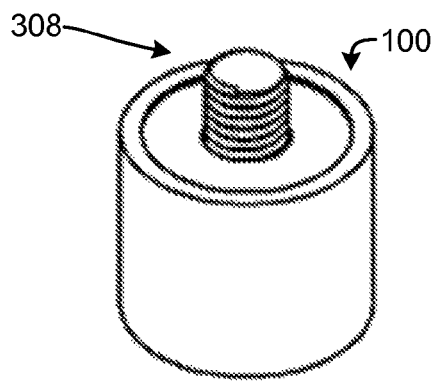
FIG. 4 is a top perspective view of the assembly shown in FIG. 3 inserted into the elastomeric joining element retaining device of FIGS. 1-3.

As shown in FIG. 2, cavity 104 of retaining device 100 may include multiple sub-cavities having different geometries. Each sub-cavity may be configured to accommodate a specific joining element, joining elements having similar dimensions, or multiple joining elements which make up part of the overall assembly of joining elements retained by retaining device 100. Sub-cavities may have circular cross sections, hexagonal cross sections, or other geometries apparent to those skilled in the relevant art(s) after reading the description herein. Each sub-cavity is open to the sub-cavity preceding it and may include a rear wall portion. In some aspects, a central area of each sub-cavity remains open, thereby allowing the shank of a bolt, screw, or similar fastener to pass through each sub-cavity and the joining element contained therein. In this fashion, an assembly of joining element containing a bolt, screw, or similar extended fastener may be aligned. Sub-cavities may have larger or smaller cross sections than adjoining sub-cavities. Sub-cavities may be sized to retain joining elements via compression. Sub-cavity features may extend through the entire body 102, facilitating the removal of elements that are inserted in error or with an incorrect orientation. The compression may create a friction fit for joining elements held within retaining device 100. Such retention enables joining elements to be retained in retaining device 100 as retaining device 100 is maneuvered into position to install the joining elements in, for example, a tight space, a hard to reach place, a blind installation location, a location requiring turning retaining device 100 upside down, and the like.

In an aspect, each sub-cavity is sized 2-2.5% smaller than the lower bound of the tolerance of the joining element intended to be retained by the sub-cavity. For example, for a sub-cavity having a circular cross section and configured to retain an ANSI/ASME B18 22.1-1965(R1998) ½-inch Type B Regular Plain Flat washer, the sub-cavity may have a diameter of 1.090 inches because the lower bound of tolerance of the outer diameter of such a washer is 1.118 inches. Sizing each sub-cavity smaller than the intended joining element facilitates retaining the joining element via compression.

In some aspects, cavity 104 and/or sub-cavities may be sized for Imperial sized-fasteners (e.g., a half-inch hex bolt), but the elastomeric nature of the construction of retaining device 100 facilitates retaining ISO standard fastener sizes (e.g., 13 or 14 mm hex bolts).

Body 104 may further include a drive socket 208 for interfacing with, for example, a ratchet wrench. In some aspects, drive socket 208 is an open square chamber sized to connect with a ⅜ inch ratchet drive. In other aspects, drive socket 208 is open on only one side.

FIG. 2 depicts retaining device 100 operable with standard SAE half-inch fasteners. Retaining device 100 may include cavity 104 comprising three sub-cavities: a flat washer cavity 202, a split-lock washer cavity 204, and a hexagonal joining element cavity 206. Flat washer cavity 202 is a circular recess for a type 2 flat washer. Washer cavity 204 is a circular recess for a split-lock washer. Hexagonal cavity 206 is a recess having a hexagonal cross section suitable for receiving a half-inch hex head bolt, hex nut, or the like.

An assembly 308 of joining elements may be retained. Assembly 308 may comprise a flat washer 302, a split ring washer 304, and a hex head bolt 306. Assembly 308 may be retained by retaining device 100 by first inserting bolt 306 into cavity 206, then inserting split ring washer 304 into cavity 204 and around the shank of bolt 306 and finally inserting flat washer 302 into cavity 202 and around shank of bolt 306. When placed within retaining device 100, the shank of bolt 306 may protrude from retaining device 100, enabling shank to be inserted into a thread hole or the like and installed.

Figure 5:
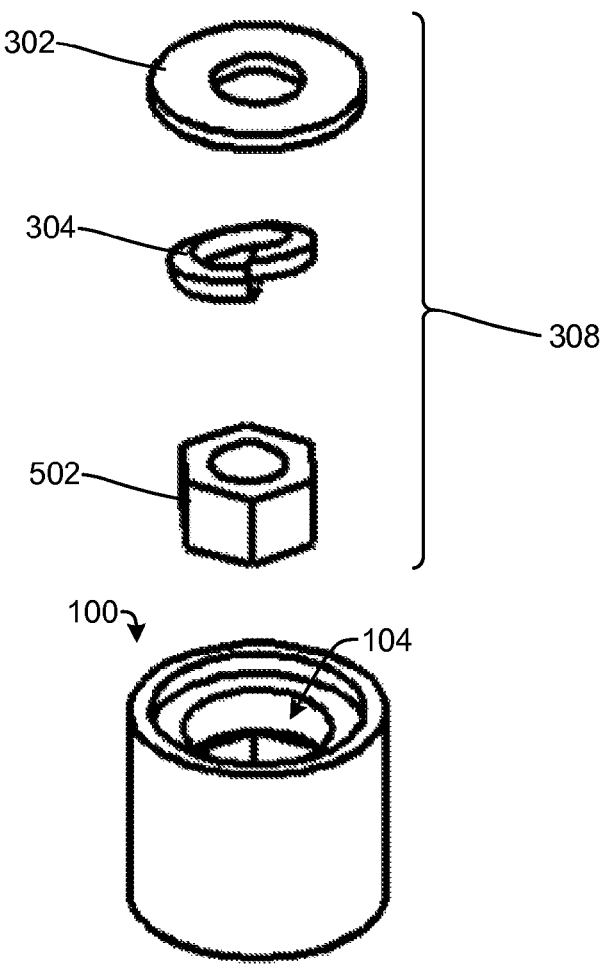
FIG. 5 is a top perspective view of an elastomeric joining element retaining device configured to retain an assembly comprising a washer, a split ring washer and a nut, in accordance with an aspect of the present disclosure.
Figure 6:
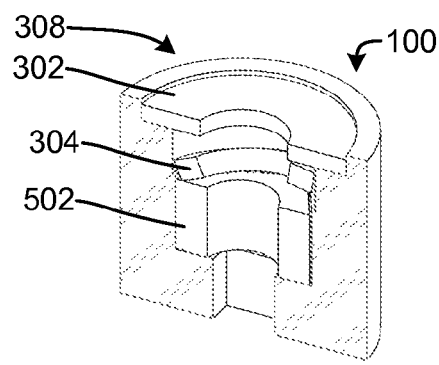
FIG. 6 is a cutaway view of the elastomeric joining element retaining device and the assembly of FIG. 5.

Referring now to FIGS. 5 & 6, a top perspective view and a cutaway view of elastomeric joining element retaining device 100 configured to retain assembly 308 comprising washer 302, split ring washer 304 and a hex nut 502, in accordance with an aspect of the present disclosure, are shown.

Retaining device 100 may retain female joining elements and be utilized to install or remove assembly 308 of female joining elements at a desired location. For example, retaining device 100 may retain hex nut 502, split ring washer 304 and flat washer 302. Via retaining device assembly 308 may be screwed onto a bolt. Afterward, retaining device 100 may be removed.

Figure 7:
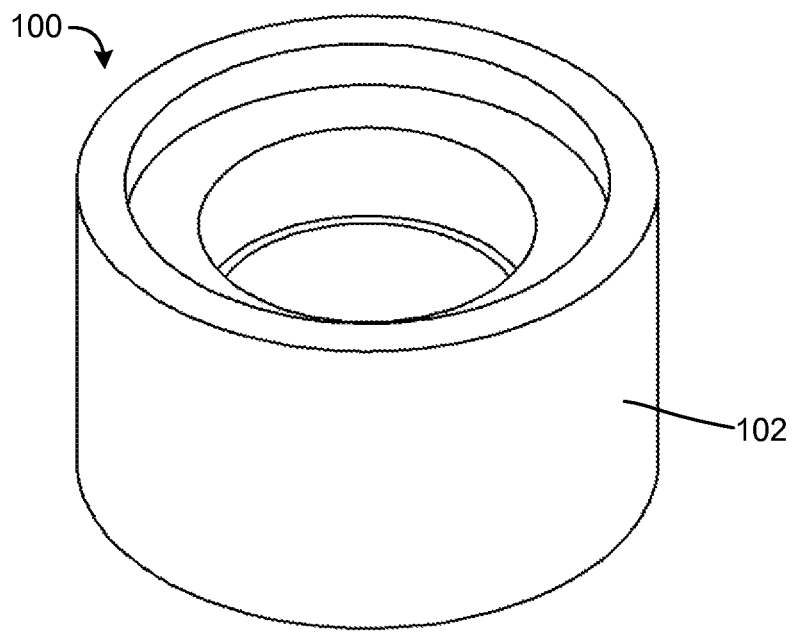
FIG. 7 is a top perspective view of an elastomeric joining element retaining device, in accordance with an aspect of the present disclosure.
Figure 8:
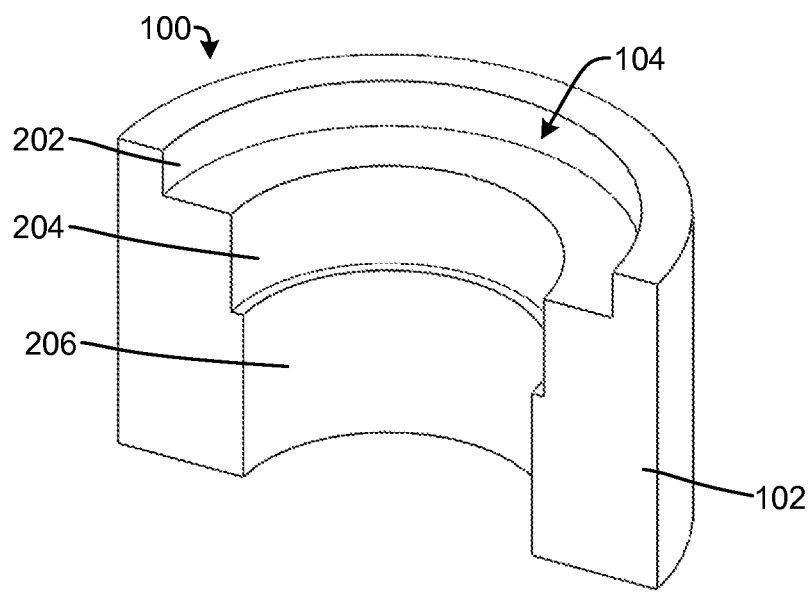
FIG. 8 is a cutaway view of the elastomeric joining element retaining device of FIG. 7.

Referring now to FIGS. 7 & 8, a top perspective view and a cutaway view of elastomeric joining element retaining device 100, in accordance with an aspect of the present disclosure, are shown.

In some aspects, cavity 104 comprises only sub-cavities having circular cross sections. Due to the elastic nature of the construction of body 102, the circular sub-cavities may accommodate circular joining elements (e.g., flat washers, lock washers, and the like), square joining elements, hexagonal joining elements, joining elements having irregular geometries and the like. As shown in FIG. 8, washer sub-cavity 202 and split ring washer sub-cavity 204 may be arranged over a third sub-cavity 206 having a circular cross-section which may still stretch and retain a hex head bolt or the like.

Outer surface 106 of retaining device 100 may be configured in a variety of ways in order to, for example, assist the user in turning retaining device 100 by hand or insert or remove joining elements. Outer surface 106 may also be configured to facilitate connecting retaining device 100 to driving tools such as a square driver, a ratchet wrench, or the like.

Figure 9:
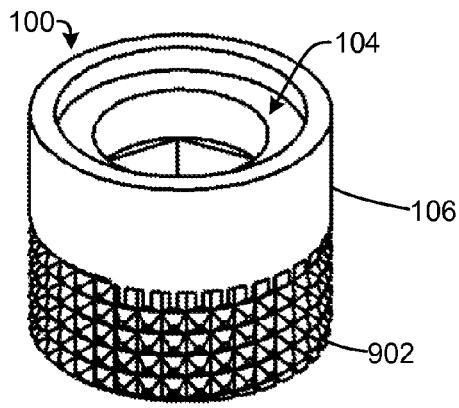
FIG. 9 is a top perspective view of an elastomeric joining element retaining device having a partially knurled outer surface, in accordance with an aspect of the present disclosure.

Referring now to FIG. 9, a top perspective view of elastomeric joining element retaining device 100 having a partially knurled outer surface 106, in accordance with an aspect of the present disclosure, is shown. A portion of outer surface 106 may comprise ridges, bumps, knurls 902 or the like in order to make it easier to grip retaining device 100.

Figure 10:
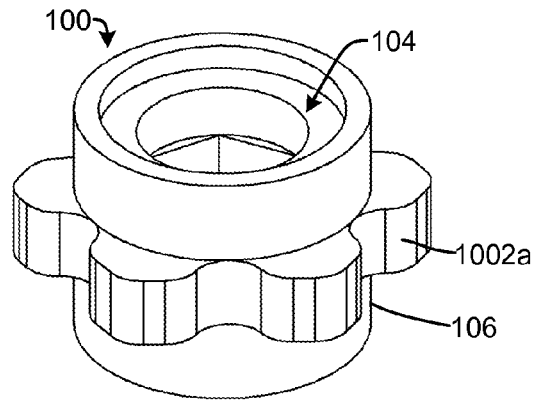
FIG. 10 is a top perspective view of an elastomeric joining element retaining device having flutes for gripping by a user, in accordance with an aspect of the present disclosure.

Referring now to FIG. 10, a top perspective view of elastomeric joining element retaining device 100 having flutes 1002 for (labeled, for clarity, only as flute 1002a in FIG. 10) gripping by a user, in accordance with an aspect of the present disclosure, is shown. Outer surface 106 may include one or more flutes 1002 which protrude from body 102 and help the user grip and twist retaining device 100.

Figure 11:
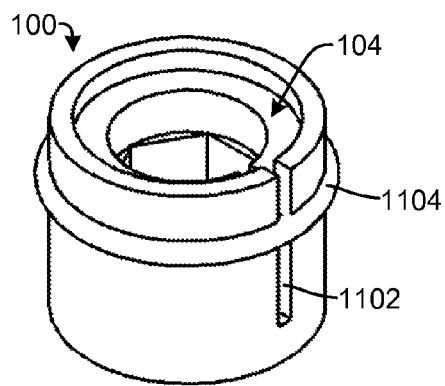
FIG. 11 is a top perspective view of an elastomeric joining element retaining device having an opening along a portion of the retaining device length and a retaining ring, in accordance with an aspect of the present disclosure.

Referring now to FIG. 11, a top perspective view of elastomeric joining element retaining device 100 having an opening 1102 along a portion of the retaining device length and a retaining ring 1104, in accordance with an aspect of the present disclosure, is shown.

Opening 1102 operates as an expansion slit in retaining device 100, expanding and exposing cavity 104. In some aspects, opening cavity 104 in this manner allows the insertion of irregular or out or tolerance joining elements. Once inserted, the joining element or elements may be installed via normal operation of retaining device 100. The joining element may be inserted by first removing retaining ring 1104, enabling manual spreading of opening 1102. Opening 1102 may be spread open and the desired joining elements inserted into cavity 104. Opening 1102 may then be released and retaining ring 1104 reseated in order to hold joining elements within cavity 104 by compression. Examples of irregular joining elements which may be operated with the assistance of retaining device 100 include but are not limited to welded up T-bolts. Retaining ring 1104 may be a split metal ring, a flexible o-ring, or the like. Body 102 may include a groove which receives retaining ring 1104.

In some aspects, body 102 or retaining ring 1104 is designed to release, split, give way, or otherwise stop transferring torque to joining elements contained therein as they are being installed. For example, body 102 may be constructed of a material having a hardness which will cause hex-head fasteners to slip within cavity 104 and no longer be tightened once the fastener torque has reached 32 ft-lbs. Retaining ring 1104 may be an elastomeric member, a spring, a split ring or similar device configured to give way when a torque of greater than 32 ft-lbs is applied. As will be apparent to those skilled in the relevant art(s) after reading the description herein, retaining device 100 ability to apply joining elements or joining element assemblies and release such elements or assemblies at a desired torque may be useful for assembly of delicate components such as circuit boards. Retaining device 100 may be configured to release joining elements, spin, or otherwise stop applying a torque when torque in the in-lbs range have been applies.

Figure 12:
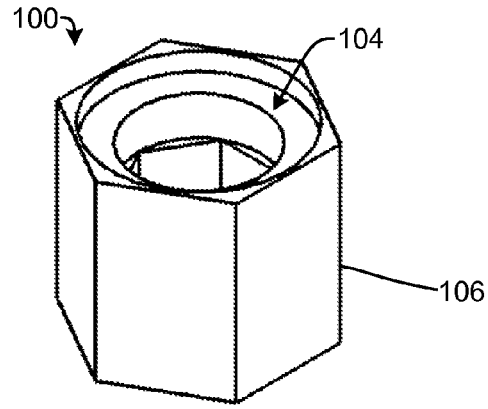
FIG. 12 is a top perspective view of an elastomeric joining element retaining device having a hexagonal outer profile, in accordance with an aspect of the present disclosure.

Referring briefly now to FIG. 12, a top perspective view of elastomeric joining element retaining device 100 having a hexagonal outer profile 106, in accordance with an aspect of the present disclosure, is shown. In some aspects, outer profile 106 is chosen to conform with standard socket profiles, or to have a hex profile thereby enabling manipulation by tools such as a wrench.

Referring now to FIG. 13, a top perspective view of elastomeric joining element retaining device 100 having two or more cavities (labeled as cavities 104a-c in FIG. 13) for retaining joining elements, in accordance with an aspect of the present disclosure, is shown.

Retaining device 100 may include multiple cavities 104 having different sub-cavity profiles, different numbers of sub-cavities, different widths, different depths, and the like. In this manner, a single retaining device 100 may be used for multiple assemblies 308, joining devices which have different sizes and/or profiles, and the like.

Retaining devices 100 having multiple cavities 104 may be used in assembly line processes. Such retaining devices 100 may be preloaded with the necessary assemblies 308, enabling workers to pick up a single retaining device 100 and install multiple assemblies 308 of joining devices or multiple joining devices, thereby reducing time of installation and increasing alignment accuracy for each assembly 308. In some aspects, retaining device 100 can be designed so at least one fastener or joining element extends beyond the edge of device 100 so that the exposed fastener length and/or the outer shape of the retaining device 100 will only engaged in a select receiving cavity, thereby reducing assembly errors.

Referring now to FIG. 14, a top perspective view of elastomeric joining element retaining device 100 configured for a wing nut 1402, in accordance with an aspect of the present disclosure, is shown. Cavity 100 or a sub-cavity may have a cross section similar to wing nut 1402, thereby allowing retaining device to be used with wing nut 1402. Cavity 100 or a sub-cavity may have a cross section suitable for receiving other specialty joining elements including but not limited to panel fasteners, hooks, hook eyes, captive fasteners, square head fasteners, pan head screws, slotted head screws, phillips head screws, security head screws and bolts, carriage bolts, U-type fasteners and the like.

Referring now to FIG. 15, a top perspective view of a set 1500 of elastomeric joining element retaining devices 100, in accordance with an aspect of the present disclosure, is shown.

In some aspects, retaining devices 100 may be created in sets 1500. Set 1500 may be modeled after common socket sets. For example, a common set could be for ¾, $^{11}\!/_{16}$, ⅝, $^{9}\!/_{16}$, ½, $^{5}\!/_{16}$, and ⅜-inch sizes. In some aspects, due to the elastomeric construction of retaining devices 100, set 1500 may be used for both Imperial-sized joining devices and metric-sized joining devices. For example, 12 mm is very close to ½ inch but slightly smaller (½ inch=12.7 mm) than 12 mm. The elasticity of retaining device 100 will accommodate this disparity in dimensions.

Figure 16:
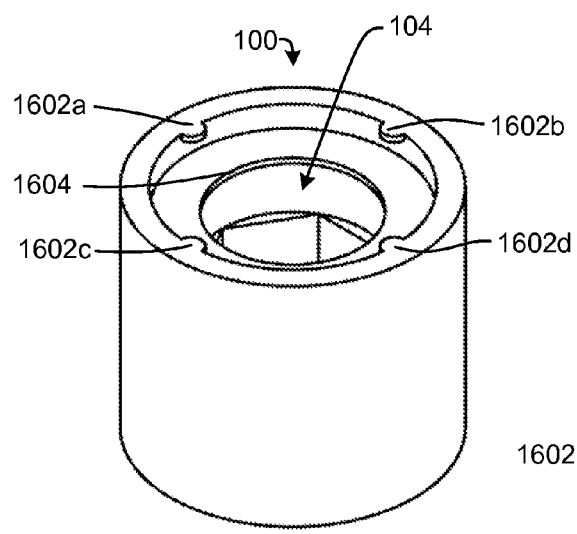
FIG. 16 is a top perspective view of an elastomeric joining element retaining device having at least one lip and multiple bosses for retaining joining elements, according to an aspect of the present disclosure.
Figure 18:
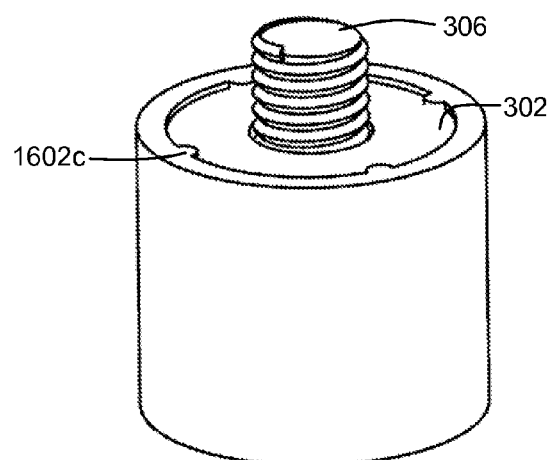
FIG. 18 is a top perspective view of the elastomeric joining element retaining device of FIGS. 16-17 having an assembly of joining elements inserted therein.
Figure 17:
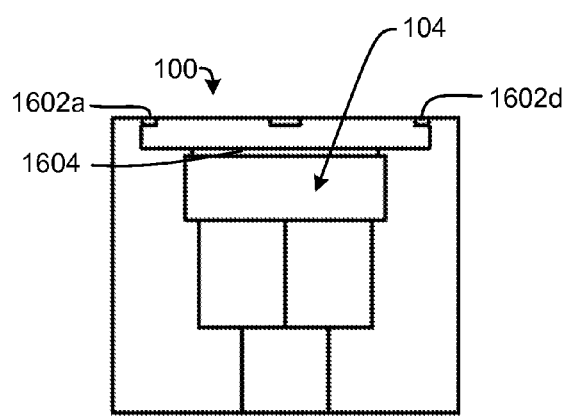
FIG. 17 is a cutaway view of the elastomeric joining element retaining device of FIG. 16, showing the lip and the bosses.

Referring now to FIGS. 16-18, various views of elastomeric joining element retaining device 100 having at least one lip and multiple bosses for retaining joining elements, including a top perspective view, a cutaway view, and view featuring an assembly loaded into retaining device 100, in accordance with aspects of the present disclosure, are shown.

Retaining device 100 may further include one or more physical stops, such as bosses 1602 (labeled as bosses 1602a-d in FIG. 16), at least one lip 1604, and/or other protrusions into cavity 104 designed to improve retention of a joining element seated therein. Such bosses 1602, lips 1604 or other protrusions may be placed at an upper or lower boundary of a sub-cavity, such as flat washer cavity 202 or split-lock washer cavity 204. In other aspects, such bosses 1602, lips 1604 or other protrusions may be located on the walls of cavity 104 at points contacting the middle, upper side, or lower side of the joining element contained therein.

In some aspects, joining elements, including for example, precision fasteners, may become slightly cocked or otherwise angled within retaining device 100. This may occur where cavity 104 is slightly larger than the maximum tolerance dimensions of joining element being retained. Bosses 1602, lips 1604 or other physical stops assist in retaining such joining elements in their respective sub-cavities. In some aspects, the physical stop (e.g., boss 1602, lip 1604) extends into cavity a sufficiently short distance that it may deform to allow loading of the joining element. Cavity 104 or sub-cavity may be made slightly deeper to allow the inserted joining element to "float" or self-align.

Figures 19, 20:
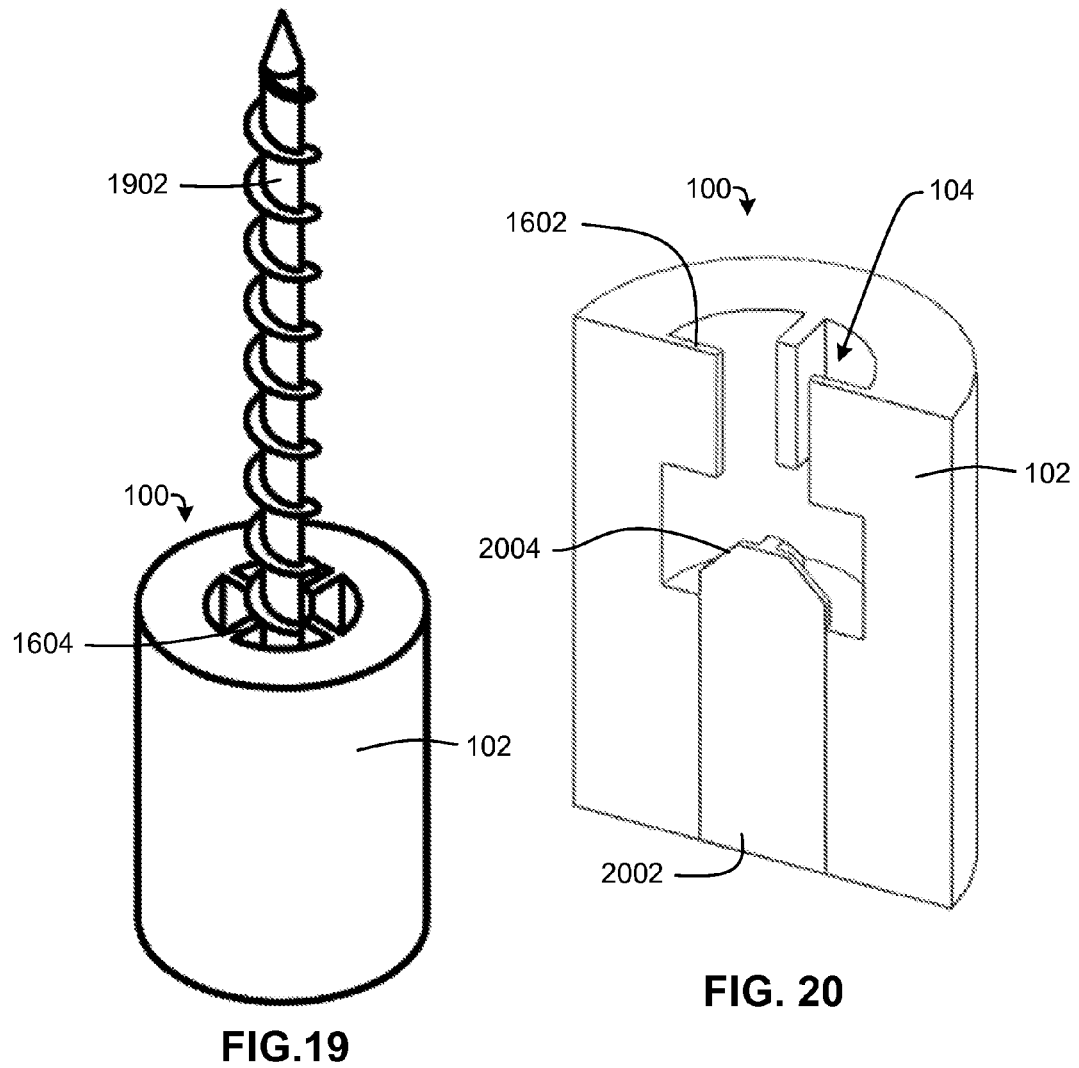
FIG. 19 is a top perspective view of an elastomeric joining element retaining device configured to retain a Phillips head fastener, in accordance with an aspect of the present disclosure.
FIG. 20 is a cutaway view of the elastomeric joining element retaining device of FIG. 19, showing a rigid insert including a drive tip portion.

Referring now to FIGS. 19-20, various views of elastomeric joining element retaining device 100 having a rigid driving insert 2002, according to various aspects of the present disclosure, are shown.

Retaining device 100 may include rigid insert 2002. Rigid insert 2002 may be configured to retain one or more joining elements, transfer applied torques to the joining element(s) contained within retaining device 100, and the like. For example, a wood screw 1902 having a Phillips head may inserted into cavity 104, stabilized by bosses 1602 and connect for stabilization and/or to receive torque with rigid driving insert 2002 at a drive tip 2004. Drive tip 2004 may be any configuration apparent to those skilled in the relevant art(s) after reading the description herein, including hex, hex socket, Phillips, slot, square, and the like. Driving insert 2002 may be integral with retaining device 100 or it may be removable. Driving insert 2002 may be positioned along a central attachment axis of retaining device 100.

While various aspects of the present disclosure have been described above, it should be understood that they have been presented by way of example and not limitation. It will be apparent to persons skilled in the relevant art(s) that various changes in form and detail can be made without departing from the spirit and scope of the present disclosure. The present disclosure should not be limited by any of the above described aspects, but should be defined only in accordance with the following claims and their equivalents.

In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A joining element retaining device for retaining an assembly of a plurality of joining elements removably accommodated therein, the joining element retaining device comprising:
    an elastomeric body, comprising:
        a body first end portion;
        a body second end portion spaced apart from the body first end portion, defining a body length; and
    at least one cavity positioned within the elastomeric body and opening at the elastomeric body first end portion, configured to retain and align an assembly of a plurality of joining elements along a central attachment axis parallel to the body length, the assembly of the plurality of joining elements being retained and aligned by the elastomeric body at an outer surface of each of the plurality of joining elements wherein the elastomeric body is reusable and removable once the assembly of a plurality of joining elements is installed.

2. The joining element retaining device of claim 1, wherein the elastomeric body is constructed of an elastomeric material having a hardness of approximately 80 Shore A.

3. The joining element retaining device of claim 1, wherein the elastomeric body is constructed of one of: polyurethane; neoprene rubber; and synthetic rubber.

4. The joining element retaining device of claim 1, wherein each of the plurality of joining elements is chosen from the group consisting of: a flat washer; a locking washer; a split ring washer; a nut; a bolt; a screw; a wing nut; a carriage bolt; stud; pin; component; a clip; and a spacer.

5. The joining element retaining device of claim 1, the at least one cavity comprising a plurality of adjoining sub-cavities, each of the plurality of sub-cavities configured to removably accommodate one of the plurality of joining elements therein.

6. The joining element retaining device of claim 5, wherein one of the plurality of sub-cavities is configured to retain a joining element having a hexagonal cross section, a sub-cavity cross section of the one of the plurality of sub-cavities being hexagonal and approximately equal to the hexagonal cross section.

7. The joining element retaining device of claim 6, wherein the one of the plurality of sub-cavities is configured to retain a joining element having a hexagonal cross section is configured to retain a hex head fastener.

8. The joining element retaining device of claim 5, wherein at least one of the plurality of sub-cavities has a circular cross section.

9. The joining element retaining device of claim 8, wherein each of the plurality of sub-cavities have circular cross sections.

10. The joining element retaining device of claim 9, wherein each of the plurality of sub-cavities deform to accommodate joining elements having non-circular cross sections.

11. The joining element retaining device of claim 1, the body end second portion comprising a drive socket configured to receive a ratchet drive.

12. The joining element retaining device of claim 1, the body comprising outer surface topography configured to facilitate user gripping of the joining element retaining device.

13. The joining element retaining device of claim 12, wherein the outer surface topography is a plurality of knurls.

14. The joining element retaining device of claim 12, wherein the outer surface topography is a plurality of flutes spaced evenly around and extending radially outward from the body.

15. The joining element retaining device of claim 1, the body comprising a vertically oriented opening extending downward from the body first end portion and extending between the cavity and a body outer surface, the opening configured to facilitate insertion of at least one joining element into the cavity, the joining element retaining device further comprising a retaining ring removably positioned around the body outer surface and maintaining a cavity shape.

16. The joining element retaining device of claim 15, the body further comprising a retaining ring groove positioned around an annulus of the body, configured for removably accommodating the retaining ring.

17. The joining element retaining device of claim 15, wherein the elastomeric body is configured to deform when a torque above a torque threshold is applied to the assembly of the plurality of joining elements retained within the cavity.

18. The joining element retaining device of claim 1, wherein the body has a hexagonal cross section.

19. The joining element retaining device of claim 1, configured to retain a second assembly of joining elements removably accommodated therein, further comprising a second cavity positioned within the elastomeric body and opening at a second cavity opening on the body, configured to retain and align an assembly of a plurality of joining elements along an attachment axis parallel to a cavity length, the second assembly of joining elements being retained and aligned by the elastomeric body via compression force applied to an outer surface of each of the joining elements of the second assembly.

20. The joining element retaining device of claim 1, wherein the assembly of the plurality of joining elements is retained and aligned by the elastomeric body via compression force applied to the outer surface of each of the plurality of joining elements.

21. The joining element retaining device of claim 1, the elastomeric body further comprising at least one deformable physical stop extending in toward the central attachment axis configured to restrict movement in a central attachment axis direction of at least one of the plurality of joining elements adjacent to the at least one deformable physical stop.

22. The joining element retaining device of claim 21, wherein the at least one deformable physical stop is a lip positioned around a cavity end portion.

23. The joining element retaining device of claim 21, wherein the at least one deformable physical stop is a boss positioned within the at least one cavity.

24. The joining element retaining device of claim 1, wherein the elastomeric body is constructed of a buoyant material.

25. The joining element retaining device of claim 1, further comprising:
 a rigid driving insert positioned within the elastomeric body, the driving insert comprising a drive tip positioned within the at least one cavity and configured to interface with a joining element drive portion.

26. The joining element retaining device of claim 25, wherein the driving insert is positioned within the body second end portion; and
 wherein the drive tip is configured as one of: a Phillips head; a slot head; a square head; a hex head; and a hex socket head.

27. A joining element retaining device configured to retain an assembly of joining elements comprising a fastener, a nut and a washer, the fastener being threaded through the nut and the washer and having a fastener head and a fastener shank, the fastener retaining device comprising:
 a cylindrical fastener body constructed of an elastomeric material comprising an open first end portion, the fastener body generally surrounding an insertion axis, the fastener body comprising:
  a washer cavity centered around the insertion axis for removably accommodating the washer therein, the washer cavity recessed in the fastener body at the open first end portion;
  a nut cavity centered around the insertion axis for removably accommodating the nut therein, the nut cavity adjoining the washer cavity; and
  a fastener head cavity centered around the insertion axis for removably accommodating the fastener head therein, the fastener head cavity adjoining the nut cavity opposite the washer cavity, the fastener shank extending through the nut cavity and the washer cavity and extending beyond the first end portion when the fastener head cavity removably accommodates the fastener head therein;
 wherein the fastener body removably accommodates the assembly as the assembly engages an insertion location.

28. A joining element retaining device for retaining at least one joining element removably accommodated therein, the joining element retaining device comprising:
 an elastomeric body to retain the at least one joining element for installation, comprising:
  a body first end portion;
  a body second end portion spaced apart from the body first end portion, defining a body length; and
  at least one cavity positioned within the elastomeric body and opening at the elastomeric body first end portion, configured to retain and align, at least one joining element along a central attachment axis, the at least one joining element being retained and aligned by the elastomeric body via contact at an outer surface of each of the at least one joining elements wherein the elastomeric body is reusable and removable from the at least one joining elements once the at least one joining element is installed.

29. The joining element device of claim 28, wherein the at least one joining element is retained and aligned by the elastomeric body via compression force applied to the outer surface of each of the at least one joining elements.

* * * * *